May 15, 1951 — B. JACOBOWSKY — 2,553,258
V-BELT PULLEY
Filed Sept 20, 1949
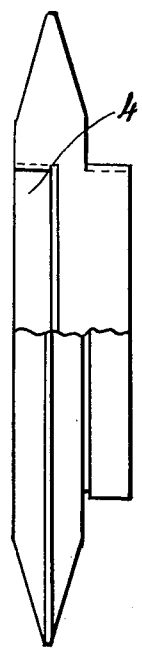
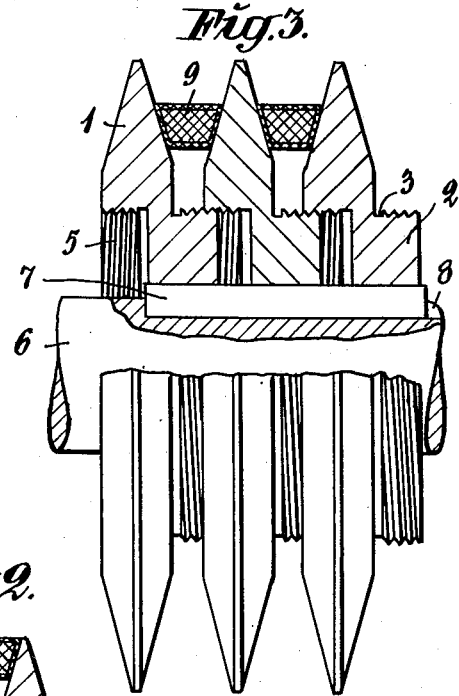
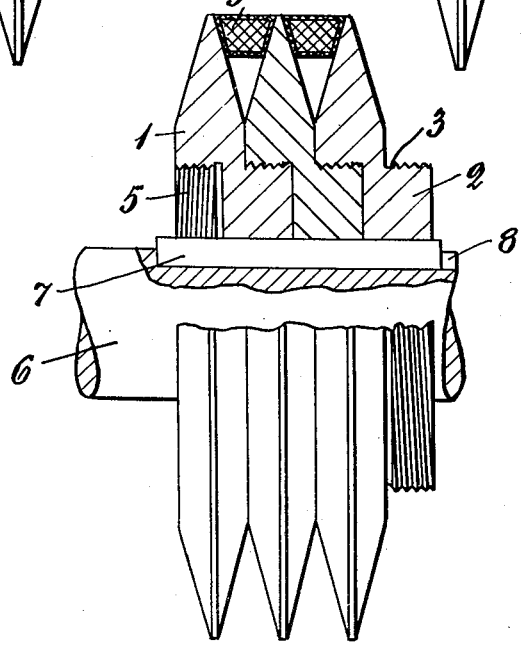
INVENTOR
BERTIL JACOBOWSKY
ATTORNEY Patented May 15, 1951

2,553,258

UNITED STATES PATENT OFFICE 2,553,258

V-BELT PULLEY

Bertil Jacobowsky, Stockholm, Sweden

Application September 20, 1949, Serial No. 116,746
In Sweden September 30, 1948

1 Claim. (Cl. 74—230.17)

The present invention relates to a V-belt pulley mounted on a shaft and comprising at least two disc sections being axially adjustable in relation to each other, said sections having at their periphery such a shape that a wedge shaped space is provided between two adjacent disc sections.

The object of the invention is to provide a V-belt pulley which is not only extendable by arranging a plurality of sections adjacent one another, but also adjustable in such a manner that different pitch diameters for the V-belts are obtainable.

The invention is substantially characterized in that each section is provided on one side with a hub having threads on its periphery, and on the other side with a cylindrical, threaded recess being formed in such a manner as to allow the hub of one of two adjacent disc sections to be screwed into the recess of the other disc section, and in that a key fitted between the disc sections and said shaft is adapted to lock the disc sections against movement in relation to one another and in relation to said shaft.

Other features of the invention will be apparent from the following in which the invention is described in detail in connection with the accompanying drawing of an embodiment of a V-belt pulley according to the invention which has been chosen as an example.

Fig. 1 illustrates one of the disc shaped sections of the V-belt pulley. Fig. 2 shows three sections of a pulley combined to a grooved pulley and mounted on a shaft. Fig. 3 shows the same pulley in which, however, the different sections are somewhat spaced.

As will be seen in the drawing, the grooved pulley consists of a number of disc shaped sections 1 which at their periphery are beveled, so as to form a wedge shaped space between two adjacent sections. In the embodiment illustrated in the drawing the sections are exactly alike and adapted to be screwed together. For this reason, each of the discs is provided with a hub 2 having threads 3 and a cylindrical recess 4, which in its circular surface is provided with threads 5 which are adapted to allow the hub 2 of one section to be screwed into the threads 5 of an adjacent section.

Due to this construction of the sections the pulley is extendable so that it may include any desired number of grooves and thus fit a corresponding number of V-belts.

When the sections or the discs are screwed tightly together, they form a V-belt pulley with maximum pitch diameter for the V-belt, but if the discs or sections are more or less spaced the pitch diameter is reduced accordingly.

For locking the sections or discs to a shaft 6 is used a key 7 engaging a groove 8 in the shaft 6 and a corresponding, not shown groove in the discs or sections.

In this embodiment the key 7 will serve two purposes. Thus it will lock the sections or discs 1 to the shaft 6 and further serve as locking means for the threads of the sections or discs in order to prevent them from being displaced in relation to one another.

The threads 3 and 5 should preferably have such a pitch that the sections or discs will have to be revolved a number of turns, for instance five turns, before their side surfaces engage one another.

In the embodiment described above and illustrated in the drawing, in which each of the sections or discs is provided with a single key groove the pitch diameter for the V-belt or belts may be decreased after the discs have been fitted to the shaft 6, for instance in the manner shown in Fig. 2. If the number of discs, as shown in the drawing, is three, the key 7 is disengaged from one or two of the discs or sections depending on if the pitch diameter for both V-belts 9 or only for one of them is to be changed. Thereupon the disengaged disc or discs are spaced from the third disc by revolving them one or more turns. After two of the discs have been spaced from the third one in this manner, the key is inserted so that it locks both the discs between which the wedge shaped space has been increased. Thereupon the outer one of the two discs, which still engage one another, is screwed out in a corresponding manner and locked by means of the key 7. In this way it is possible to space the discs 1 so that they are positioned as shown in Fig. 3. In doing so the key 7 does not have to be detached from the shaft 6, but only be displaced so much that the disc or discs which are to be revolved one or more turns are disengaged from the key 7. After revolving the discs the key is re-inserted into the key-groove of the discs 1.

In this manner it is thus possible to achieve that the V-belt pulley is adapted for one or more other diameters. Naturally the pitch diameter for the V-belt may also be decreased or increased in other ways than the one mentioned above. Thus all the discs may be removed from the shaft, adjusted according to requirement and remounted on the shaft and locked by means of the key 7.

As there is a key groove in each of the discs they will all be subjected to the same torque and the threads will only be subjected to the comparatively small force caused by the axial thrust of the key 7.

The invention is not limited to the use of only one key groove. Each disc may also be provided with several key grooves, if it is desirable to reduce the pitch diameter less than what can be achieved by revolving the discs a full turn. As a rule, however, this is not necessary. In both cases, however, it is sufficient to use a single key for all discs 1.

Moreover, the invention is not limited to the use of a key 7 and a corresponding groove in the shaft and the discs, as this construction is only necessary for round shafts 6, which are the most commonly used. Should the shaft 6, however, be square or hexagonal in cross section, no key 7 is required, providing the bore in the discs 1 is of corresponding shape.

The advantage of the V-belt pulley according to the invention is, as will be apparent from the above, that it may be extended or reduced to receive any required number of V-belts and that a pulley of one size is adaptable for several different diameters of pitch without any alterations of the discs 1 themselves having to be carried out.

By means of the described discs it is thus possible to obtain a number of different diameters of pitch for the V-belt with one and the same size of disc, thus inter alia considerably facilitating the keeping in stock of pulleys for various diameters of pitch. In this connection it may be mentioned that in most cases the discs should preferably not be provided with key grooves when they are put in stock, but this should be done after receipt of order, or when the pulleys are to be delivered.

As mentioned above, the discs may be provided with several key grooves allowing further changes in the diameter of pitch, but these changes may also be carried out by altering the pitch of the corresponding threads 3 and 5 for two or more of the discs as required.

The invention is not limited to the embodiment described and illustrated in the drawing, but may be varied in a number of different ways within the scope of the invention.

Having now particularly described the nature of my invention and the manner of its operation what I claim is:

A V-belt pulley mounted on a shaft and comprising at least two disc sections being axially adjustable in relation to each other, said sections having at their periphery such a shape that a wedge shaped space is provided between two adjacent disc sections, characterized in that each section is provided on one side with a hub having threads on its periphery, and on the other side with a cylindrical, threaded recess being formed in such a manner as to allow the hub of one of two adjacent disc sections to be screwed into the recess of the other disc section, and in that a key fitted between the disc sections and said shaft is adapted to lock the disc sections against movement in relation to one another and in relation to said shaft.

BERTIL JACOBOWSKY.

REFERENCES CITED

The following references are of record in the file of this patent:

UNITED STATES PATENTS

| Number | Name | Date |
|---|---|---|
| 2,140,182 | Bowen | Dec. 13, 1938 |
| 2,209,736 | Livingston | July 30, 1946 |

FOREIGN PATENTS

| Number | Country | Date |
|---|---|---|
| 28,097 | Great Britain | 1909 |
| 452,334 | France | May 14, 1913 |